A. BADOWSKI.
TRANSPARENT CAP FOR TIRE STEM PRESSURE GAUGES.
APPLICATION FILED OCT. 19, 1921.

1,429,313. Patented Sept. 19, 1922.

Alfred Badowski
Inventor:

By
Attorney.

Patented Sept. 19, 1922.

1,429,313

UNITED STATES PATENT OFFICE.

ALFRED BADOWSKI, OF CHARLESTON, WEST VIRGINIA, ASSIGNOR TO TIROMETER VALVE CORPORATION OF AMERICA, OF CHARLESTON, WEST VIRGINIA, A CORPORATION OF WEST VIRGINIA.

TRANSPARENT CAP FOR TIRE-STEM PRESSURE GAUGES.

Application filed October 19, 1921. Serial No. 508,736.

*To all whom it may concern:*

Be it known that I, ALFRED BADOWSKI, a citizen of the United States, residing at Charleston, in the county of Kanawha and State of West Virginia, have invented new and useful Improvements in Transparent Caps for Tire-Stem Pressure Gauges, of which the following is a specification.

The invention relates to caps which are utilized on valve stems carrying pressure gauges. With these stems it is desirable to have a transparent cap so that the gauges may be observed at all times and glass seems the most available material for the purpose. Transparent material for the purpose does not lend itself readily to attachment to the valve stem and it is, therefore, necessary to supply a metal base.

The present invention relates to the means of securing this base on the transparent tube forming the cap.

The invention is illustrated in the accompanying drawings as follows:—

Figure 1:
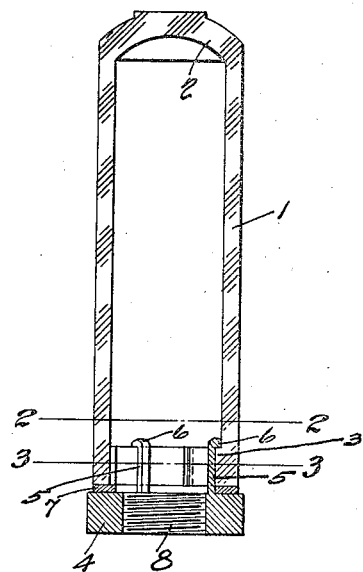

Fig. 1 shows a central vertical section of the cap.

Figure 2:
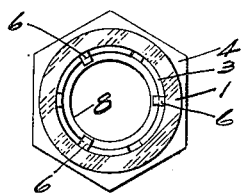

Fig. 2 a section on the line 2—2 in Fig. 1.

Figure 3:
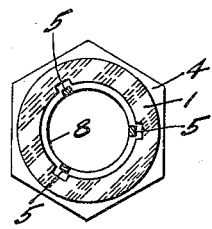

Fig. 3 a section on the line 3—3 in Fig. 1.

1 marks a glass tube, 2 a closure for the tube, 3 an internal shoulder on the tube, 4 a metal base, and 5 upwardly extending projections on the base, these projections being undercut forming a radially extending shoulder.

The shoulder 3 in the glass tube is provided with axially extending slots so positioned that all the shoulders 6 may pass through them bringing the shoulders 6 to a point above the shoulder 3. The base is then turned, thus locking the base in place. This structure forms a convenient one in that it may be readily assembled and new glass tubes may be added to it in case of breakage.

A washer 7 of felt or similar material is preferably arranged between the bottom of the tube and the base 4 to relieve the tube of any undue strain from uneven surfaces and to give a spring-pressed engagement to the shoulders 6 on the shoulder 3. The base is provided with a screw-threaded opening 8 through which a valve stem may be screwed so as to present the pressure gauge in the transparent part of the tube.

What I claim as new is:—

1. A transparent cap for tire stem pressure gauges comprising a transparent tube having a closure at the outer end and open at the bottom end and having a circumferentially extending shoulder at the bottom end with an axially extending slot therethrough; and a metal base having an upwardly extending projection having a radially extending shoulder engaging the shoulder on the tube, the radially extending shoulder on the projection being of a size permitting the assembly of the tube and base by passing the last-mentioned shoulder through the slot in the shoulder on the tube.

2. A transparent cap for tire stem pressure gauges comprising a transparent tube having a closure at the outer end and open at the bottom end and having a circumferentially extending shoulder at its inner end with axially extending slots therethrough; and a metal base having upwardly extending projections having radially extending shoulders so spaced as to permit the passage of the shoulders through the slots in the shoulder on the tube, said radially extending shoulders on the projections engaging the shoulder on the tube for securing the tube on the base.

3. A transparent cap for tire stem pressure gauges comprising a transparent tube having a closure at the outer end and open at the bottom end and having a circumferentially extending internal shoulder at the bottom end with an axially extending slot therethrough; and a metal base having an upwardly extending projection having a radially extending shoulder engaging the shoulder on the tube, the radially extending shoulder on the projection being of a size to permit the assembly of the tube and base by passing the last-mentioned shoulder through the slot in the shoulder on the tube.

4. A transparent cap for tire stem pressure gauges comprising a transparent tube having a closure at the outer end and open at the bottom end and having a circumferentially extending internal shoulder at its inner end with axially extending slots therethrough; and a metal base having upwardly extending projections having radially extending shoulders so spaced as to permit the passage of the shoulders through the slots in the shoulder on the tube, said radially extending shoulders on the projections engaging the shoulder on the tube for securing the tube on the base.

In testimony whereof I have hereunto set my hand.

ALFRED BADOWSKI.